United States Patent [19]

Yamada

[11] Patent Number: 4,889,416

[45] Date of Patent: Dec. 26, 1989

[54] FINITE DISTANCE ZOOM LENS

[75] Inventor: Yu Yamada, Kokubunji, Japan

[73] Assignee: Canon Kabushiki Kaisha, Tokyo, Japan

[21] Appl. No.: 76,008

[22] Filed: Jul. 22, 1987

[30] Foreign Application Priority Data

Jul. 25, 1986 [JP] Japan ................................ 61-175074

[51] Int. Cl.[4] ................................................ G02B 15/14

[52] U.S. Cl. ................................................ 350/426

[58] Field of Search ......................... 350/426, 423, 427

[56] References Cited

U.S. PATENT DOCUMENTS

| | | | |
|---|---|---|---|
| 3,771,853 | 11/1973 | Nakamura | 350/426 |
| 4,241,981 | 12/1980 | Okudaira | 350/426 |
| 4,406,523 | 9/1983 | Sato et al. | 350/426 |
| 4,474,436 | 10/1984 | Itoh | 350/426 |
| 4,477,153 | 10/1984 | Suda et al. | 350/426 |
| 4,571,031 | 2/1986 | Kato | 350/426 |
| 4,653,873 | 3/1987 | Kawamura | 350/426 X |

FOREIGN PATENT DOCUMENTS

| | | | |
|---|---|---|---|
| 55-35323 | 3/1980 | Japan | 350/426 |
| 59306 | 1/1986 | Japan . | |

*Primary Examiner*—Scott J. Sugarman

*Attorney, Agent, or Firm*—Fitzpatrick, Cella, Harper & Scinto

[57] ABSTRACT

A zoom lens includes a negative first group disposed on the enlarging side and comprising, in succession from the enlarging side, a negative first lens whose reducing side surface has a sharper curvature than the enlarging side surface, a positive second lens whose enlarging side surface has a sharper curvature than the reducing side surface, and a negative third lens, and a positive second group disposed on the reducing side. The spacing between the first group and the second group is variable to accomplish a magnification change.

12 Claims, 10 Drawing Sheets

10
20
I II III
IV V VI VII VIII IX

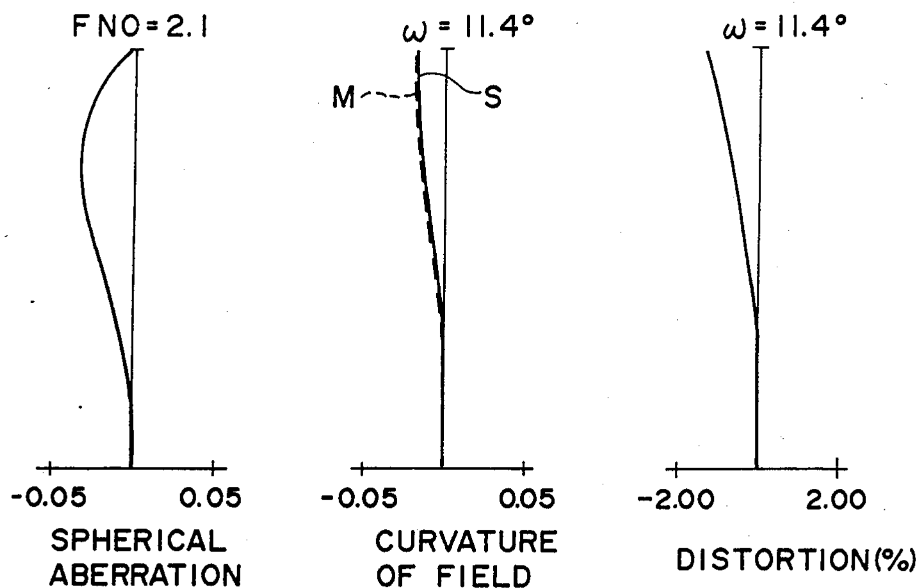
F I G. 4A
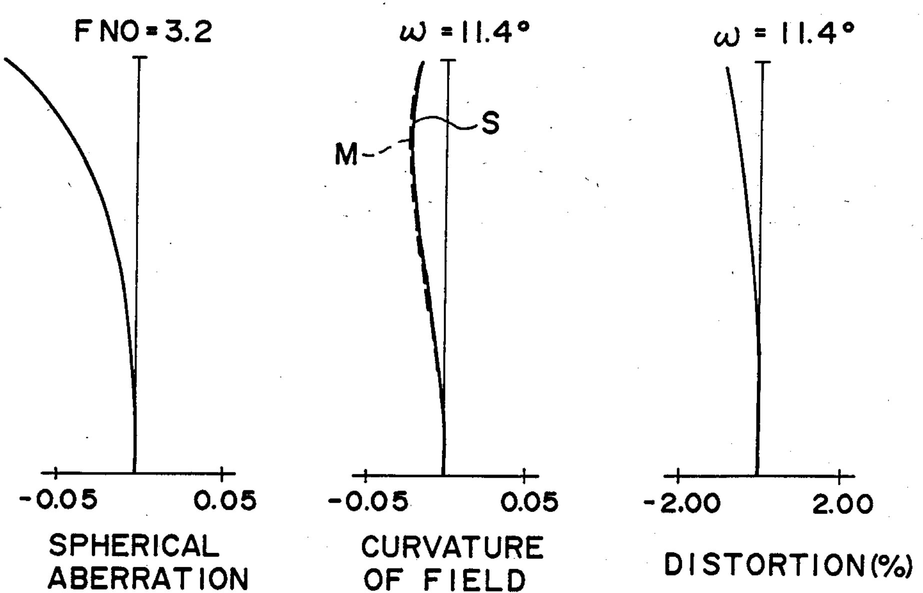
F I G. 4B

FINITE DISTANCE ZOOM LENS

BACKGROUND OF THE INVENTION

1. Field of the Invention

This invention relates to a zoom lens, and in particular to a zoom lens which is suitable for a microfilm reader, a printer, micro-photography and the like and in which a magnification change is effected with the distance between an object and the image thereof being maintained at a predetermined finite distance.

2. Related Background Art

In the projection optical systems of microfilm readers, printers, copying machines, etc., there have heretofore been proposed various zoom lenses designed to effect a magnification change while the distance between an object and the image thereof is maintained at a predetermined finite distance and continuously obtain a projection magnification.

Such zoom lenses, as compared with those of the turret type in which a plurality of fixed-focus lenses are rotated, have a feature that the projection magnification can be obtained continuously and quickly and moreover easily. For example, U.S. Pat. No. 4,474,436 (Japanese Laid-Open (Kokai) Patent Application No. 73715/1982) and Japanese Laid-Open (Kokai) Patent Application No. 59306/1986 disclose so-called two-group type zoom lenses which have, in succession from the object side, i.e., the enlarging side, a first lens group of negative refractive power and a second lens group of positive refractive power and in which a magnification change is effected with the distance between the object and the image thereof being maintained at a predetermined finite distance and with the spacing between the two lens groups being varied.

However, in the former, the photographing magnification has been 7 to 15 times and F-number has been F4.6–3.4, and in the latter, the photographing magnification has been 6 to 10 times and F-number has been F4.8–4.5, and both of them have been low in photographing magnification and dark in F-number.

SUMMARY OF THE INVENTION

It is an object of the present invention to provide a compact zoom lens of high resolving power in which the projection magnification can be changed, for example, from 50 times to 33 times and which has an F-number as bright as 2.1–3.2.

It is a further object of the present invention to provide a zoom lens which is suitable for a microfilm reader, a printer or the like and which is simple in lens construction and has a good optical performance.

It is still a further object of the present invention to provide a zoom lens of high performance in which the projection magnification can be continuously changed while the distance between an object and the image thereof remains maintained at a finite distance.

To achieve the above objects, a zoom lens in accordance with the present invention has in succession from the enlarging side a first lens group of negative refractive power and a second lens group of positive refractive power, the spacing between the two lens groups being variable to accomplish a magnification change, and is characterized in that said first group is comprised of a negative first lens whose reducing side surface has a sharper curvature than the enlarging side surface, a positive second lens whose enlarging side surface has a sharper curvature than the reducing side surface, and a negative third lens.

A certain form of the zoom lens in accordance with the present invention is a zoom lens having in succession from the enlarging side a first lens group of negative refractive power and a second lens group of positive refractive power, the spacing between the two lens groups being variable to accomplish a magnification change, and the image of an object being formed on the image surface with the distance between the object and the image thereof remaining fixed, characterized in that said first group comprises, in succession from the enlarging side, a negative first lens, a positive second lens and a negative third lens.

Also, according to the present invention, when the focal length of the negative first lens is $f_1$ and the focal length of the negative third lens is $f_3$, design is made such that the ratio between these two local lengths (i.e., the parameter corresponding to the distribution of the refractive powers of the first and third lenses) satisfies the condition that $0.1<f_1/f_3<1.8$, whereby good aberration correction can be accomplished while compactness of the zoom lens is achieved.

Also, design is made such that the ratio between the focal length fa of an air lens formed by the positive second lens and the negative third lens and the focal length F1 of the first group (i.e., the allotment rate of the refractive power of the air lens in the first group) satisfies the condition that $0.5<f_a/F1<2.2$, whereby good aberration correction can be accomplished and particularly, correction of coma becomes good.

One specific and effective form of the present invention is characterized in that said second group has a fourth lens portion of positive refractive power having a plurality of lenses, a positive fifth lens, a negative sixth lens, a negative seventh lens whose reducing side surface has a sharper curvature than the enlarging side surface, an eighth lens whose both lens surfaces are convex, and a negative ninth lens whose enlarging side surface has a sharper curvature than the reducing side surface, and the following conditions are satisfied:

$$0.1<f_1/f_3<1.8$$

$$0.5<fa/F1<2.2$$

$$0.1<\Phi_{62}/\Phi_{72}<2.3$$

$$-5<f_9/F2<-1$$

where F1 and F2 are the focal lengths of said first group and said second group, respectively, $f_i$ is the focal length of the ith lens, $f_a$ is the focal length of an air lens formed by said second and third lenses, and $\Phi_{62}$ and $\Phi_{72}$ are the refractive powers of the reducing side lens surfaces of said sixth and seventh lenses, respectively.

Further features of the present invention will become apparent from the following detailed description of some embodiments of the invention. Of course, the embodiments which will hereinafter be described merely show one form of the present invention, and various forms of zoom lens can be easily provided on the basis of the concept of the present invention.

BRIEF DESCRIPTION OF THE DRAWINGS

FIGS. 4A to 12B show various aberrations in the lens systems shown in Numerical Value Examples 1-9 of the present specification.

DESCRIPTION OF THE PREFERRED EMBODIMENTS

Figure 1:
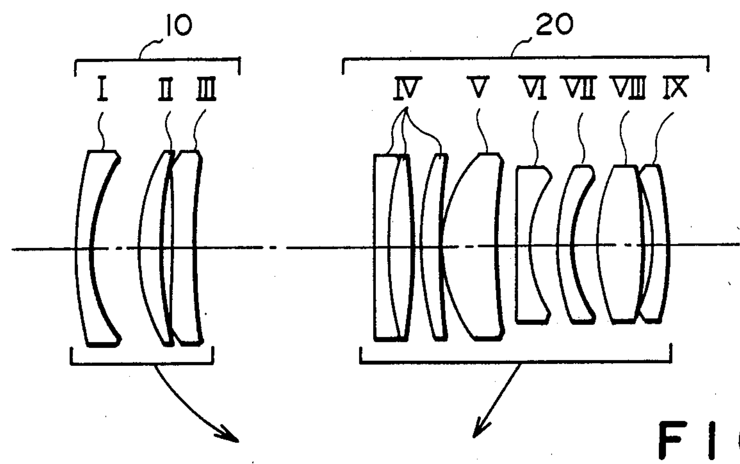
FIG. 1 is a cross-sectional view showing a first embodiment of the zoom lens according to the present invention which is a lens system corresponding to Numerical Value Example 1 of the present specification.
Figure 2:
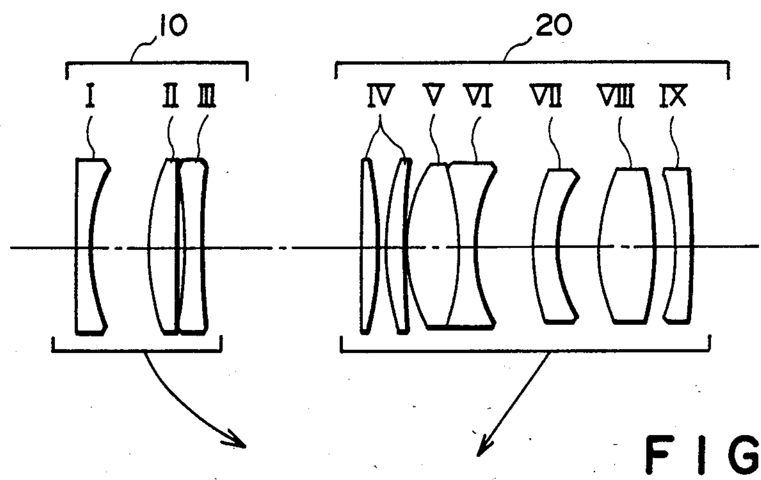
FIG. 2 is a cross-sectional view showing a second embodiment of the zoom lens according to the present invention which is a lens system corresponding to Numerical Value Example 8 of the present specification.
Figure 3:
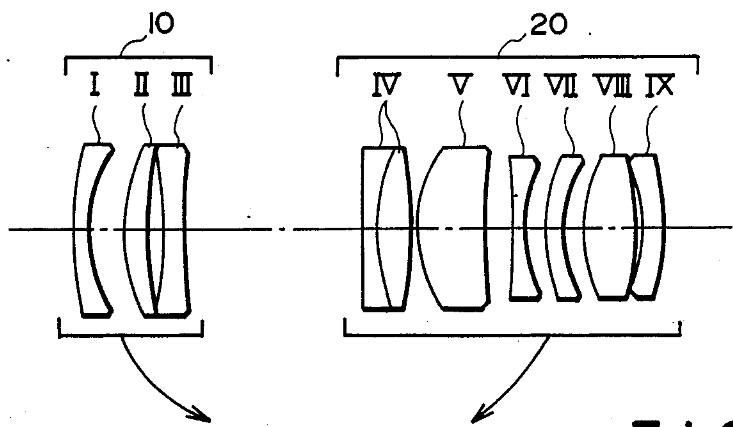
FIG. 3 is a cross-sectional view showing a third embodiment of the zoom lens according to the present invention which is a lens system corresponding to Numerical Value Example 9 of the present specification.
Figure 5A:
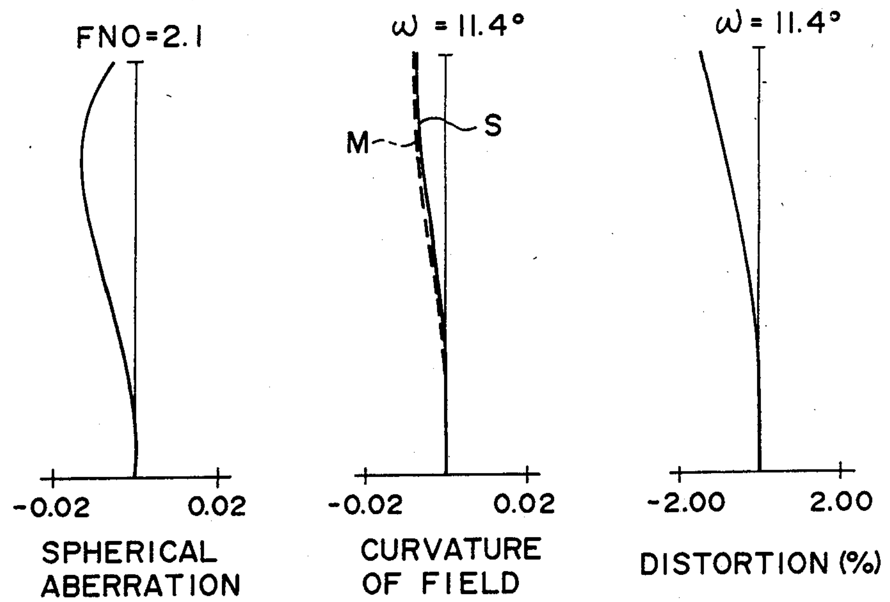
Figure 5B:
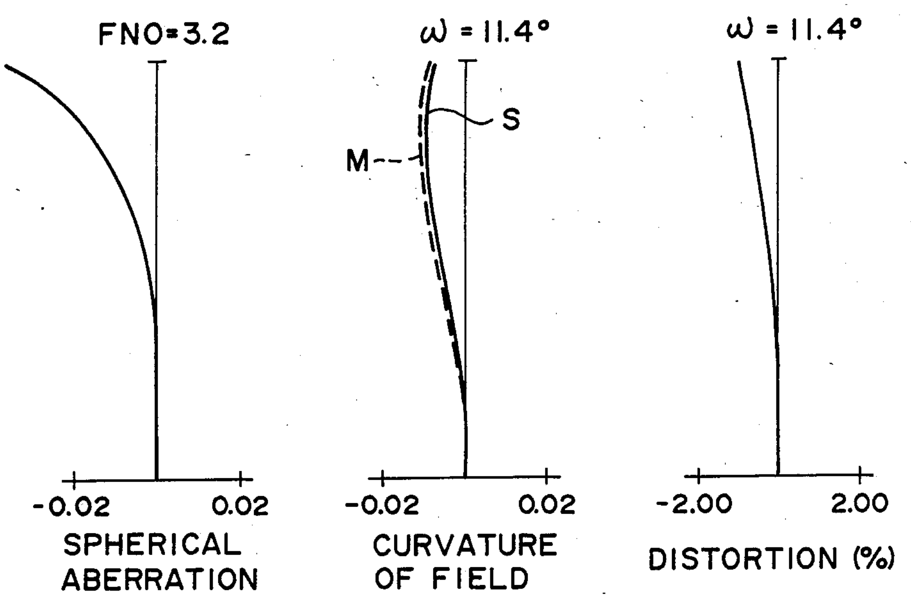
Figure 6A:
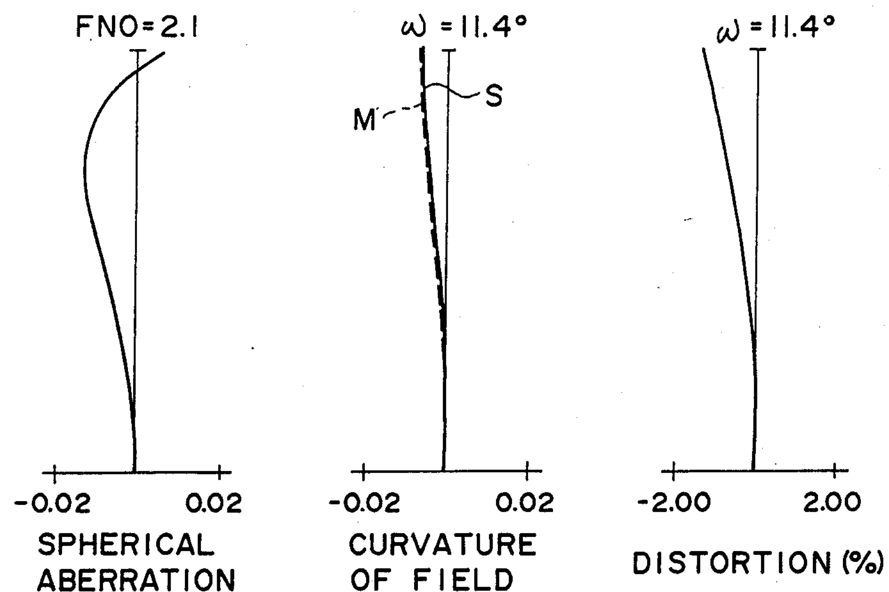
Figure 6B:
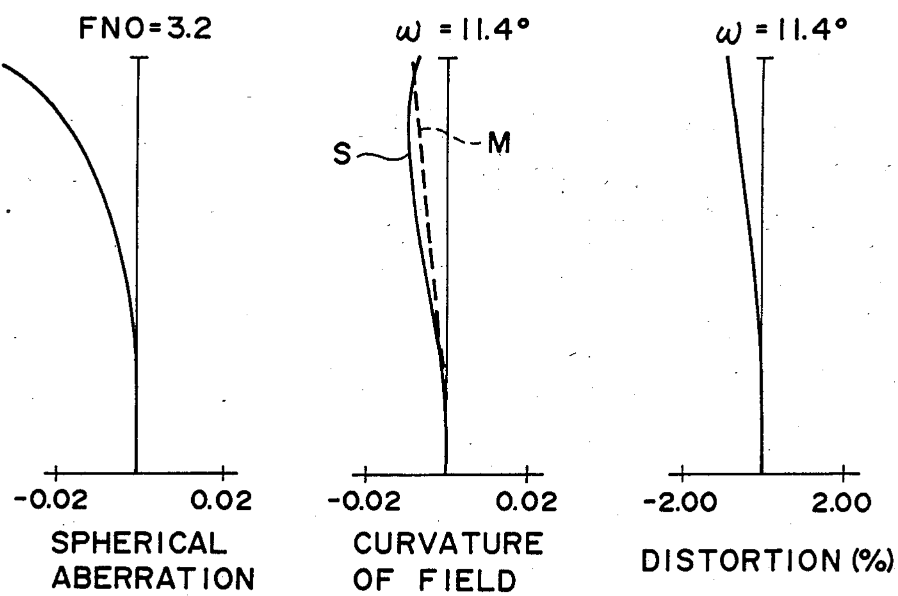
Figure 7A:
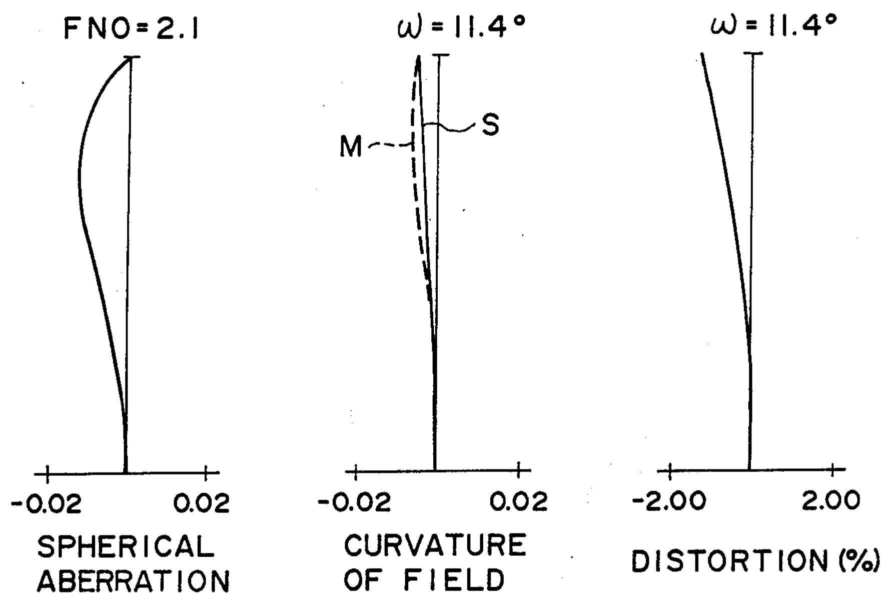
Figure 7B:
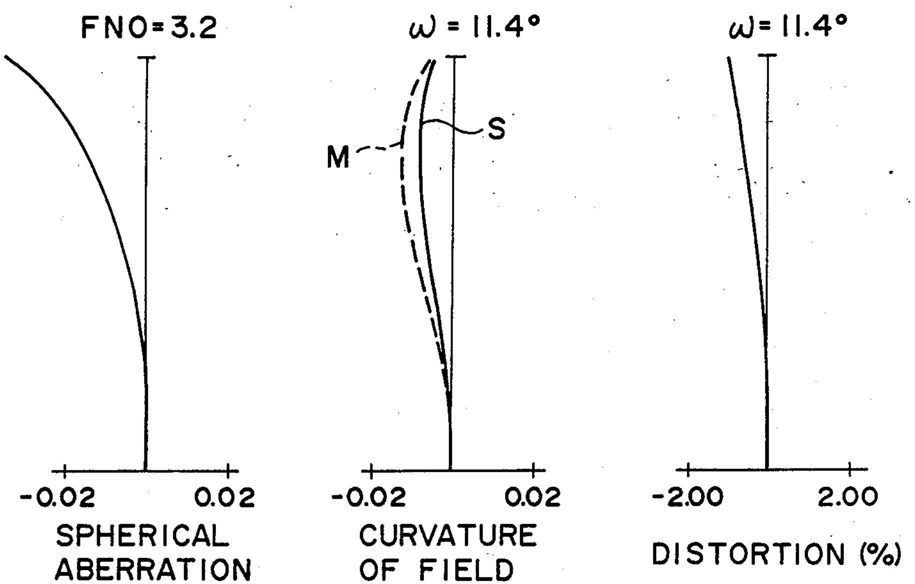
Figure 8A:
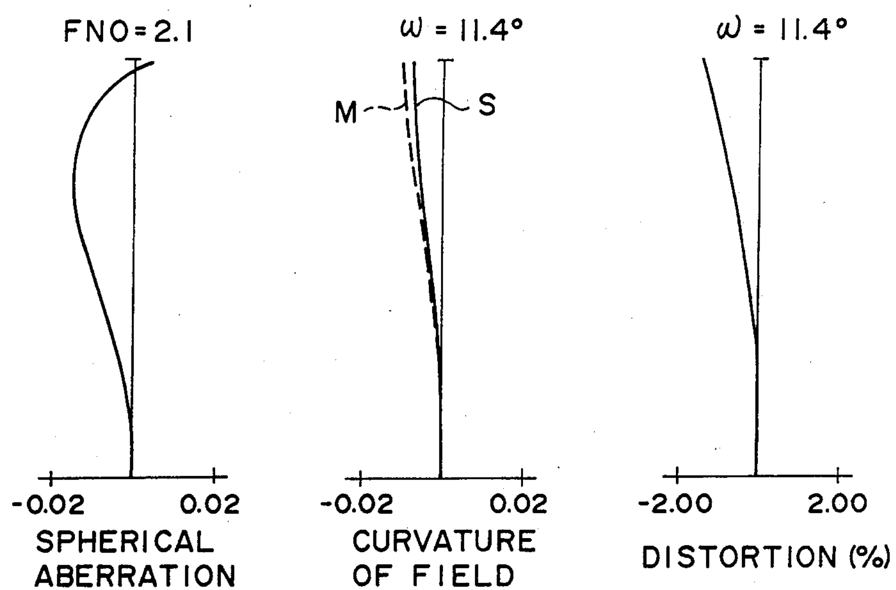
Figure 8B:
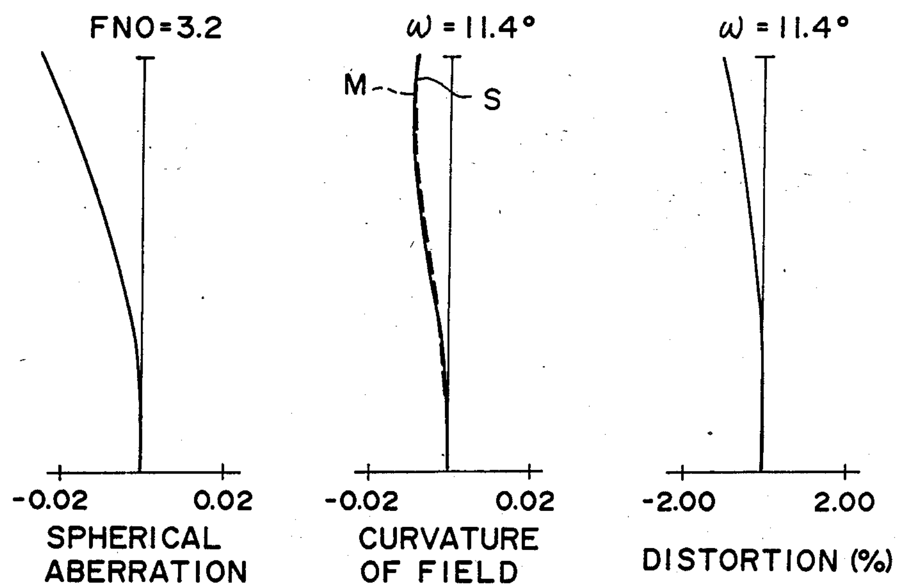
Figure 9A:
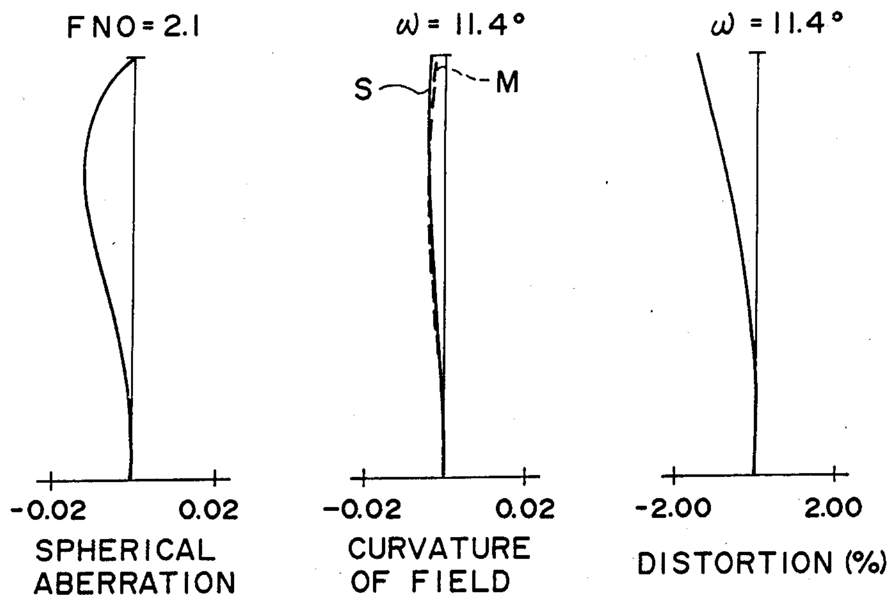
Figure 9B:
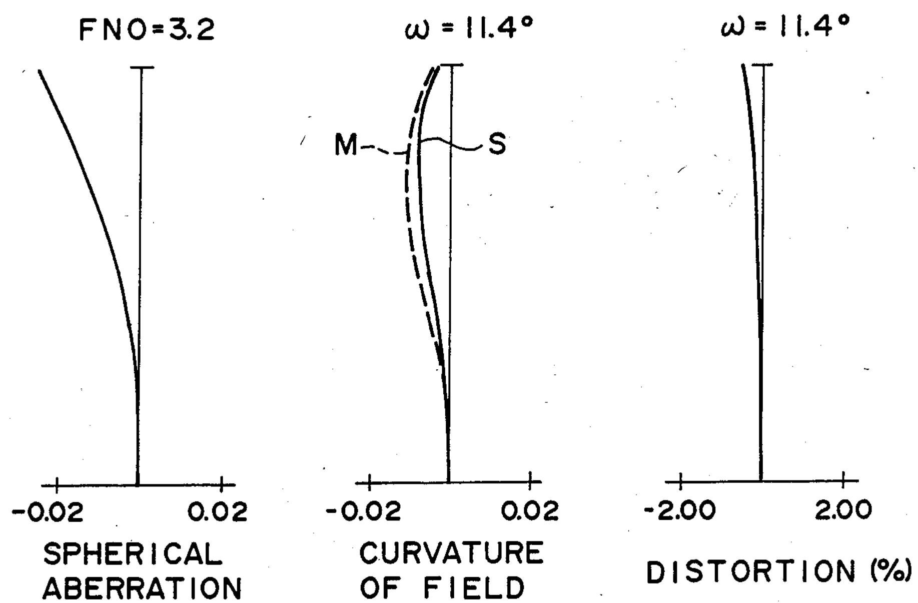
Figure 10A:
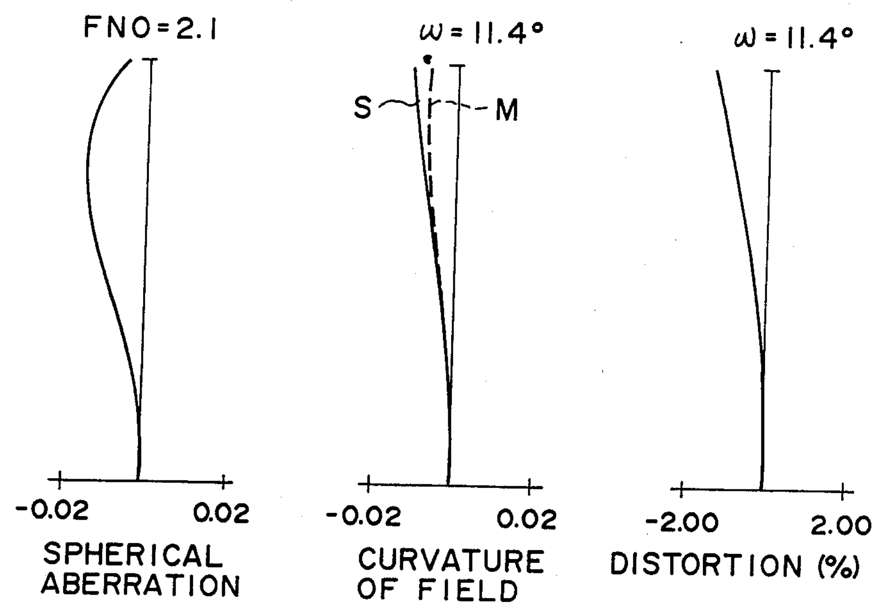
Figure 10B:
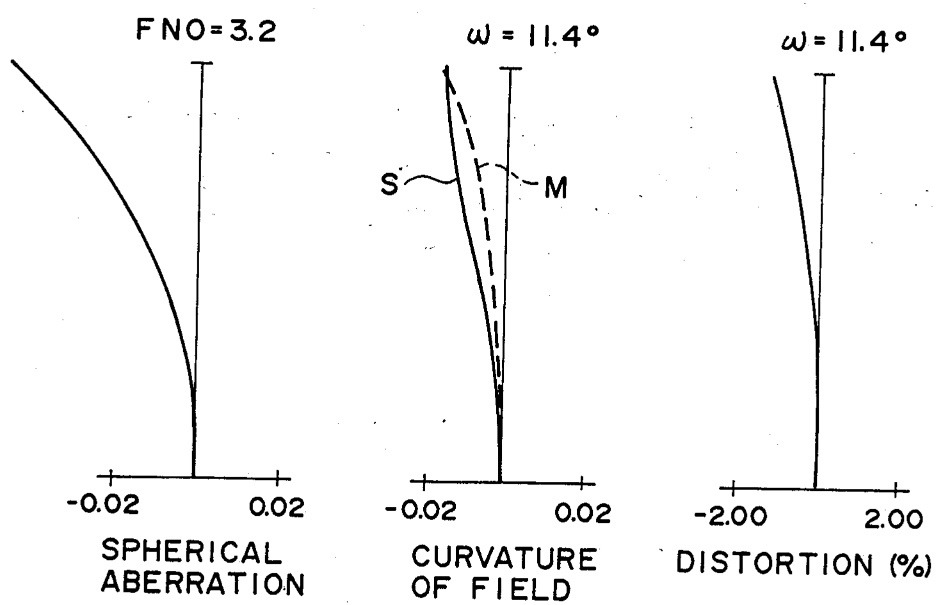
Figure 11A:
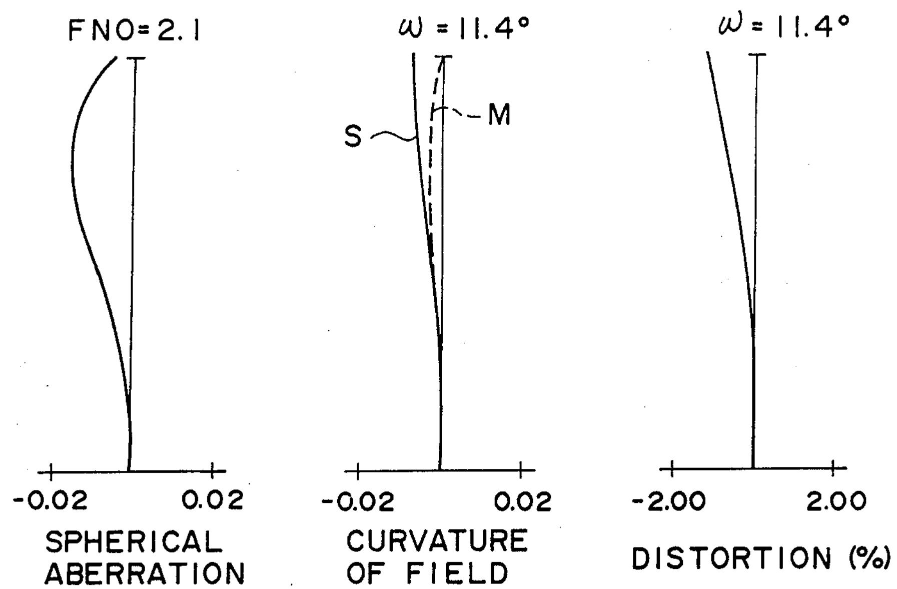
Figure 11B:
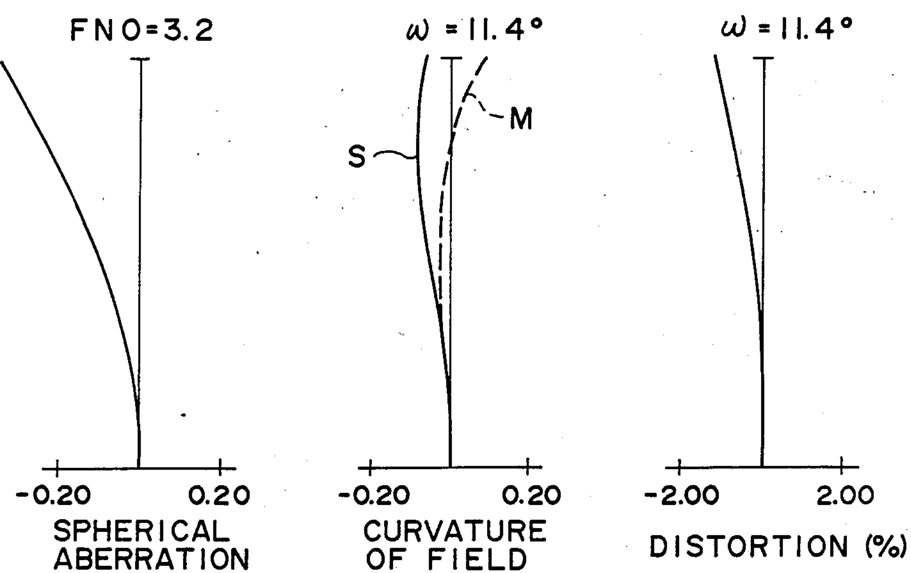
Figure 12A:
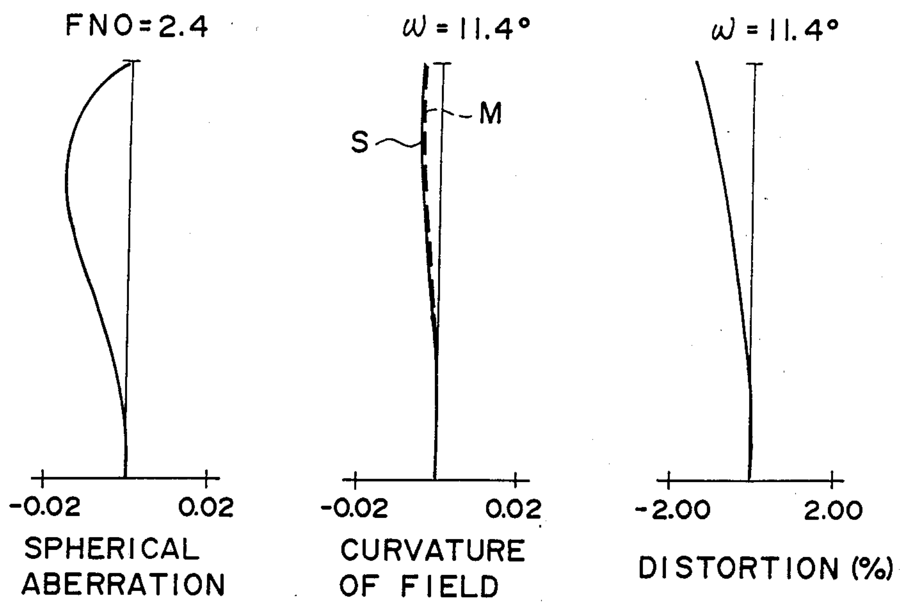
Figure 12B:
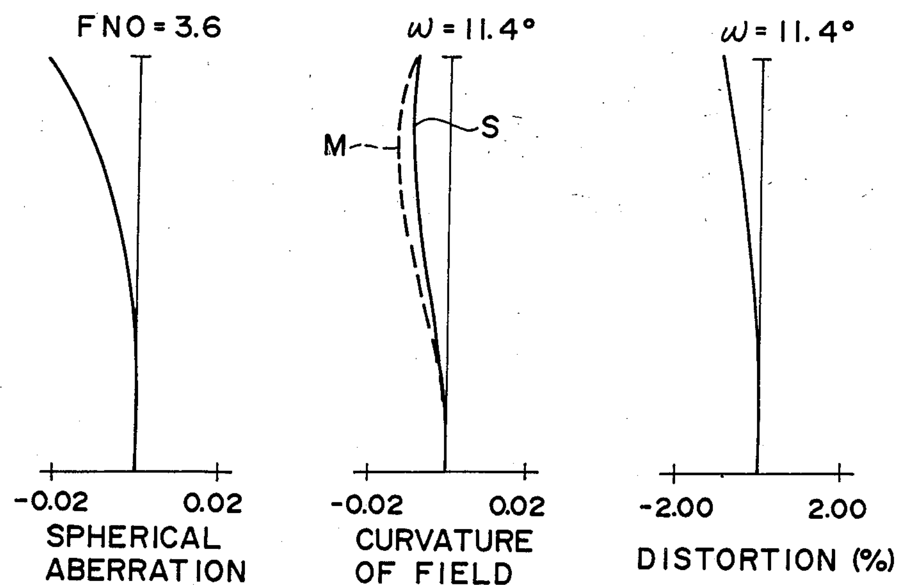

FIGS. 1, 2 and 3 are cross-sectional views of the lenses of Numerical Value Examples 1, 8 and 9, respectively, of the present invention which will be described later. In these figures, reference numeral 10 designates a first group of negative refractive power, and reference numeral 20 denotes a second group of positive refractive power. The arrows in these figures indicate the directions of movement of the respective lens groups 10 and 20 when magnification change is effected from the short focus to the long focus.

The first group 10 side is the enlarging side of the shown optical system, and the second group 20 side is the reducing side of the shown optical system. I, II, III, . . ., IX designate the ith lens or the ith lens portion as counted from the enlarging side. In the present embodiment, as shown in FIGS. 1, 2 and 3, the first group 10 of the enlarging side of the optical system is constituted by three lenses of predetermined shapes, and the second group 20 of the reducing side of the optical system is constituted by at least seven lenses of predetermined shapes. A magnification change is effected with the spacing between the two lens groups 10 and 20 being varied while the distance between an object and the image thereof is maintained at a predetermined finite distance, whereby projection magnification is continuously varied. Thereby there is provided a bright zoom lens of high resolving power in which the aberration fluctuation during a magnification change is small over the entire picture plane for various projection magnifications such as magnifications 50–33.

Where the optical system shown in FIG. 1, 2 or 3 is used as a zoom lens for a microfilm reader, a microfilm is disposed on the second group 20 side (at the right as viewed in the figure). On the first group 10 side (at the left as viewed in the figure), there is disposed, for example, a screen or the like which provides a projection surface.

The information of the microfilm is enlargedly projected onto the screen by the shown zoom lens.

The zoom lens of the present embodiment is suitable as the optical system for the above-described microfilm reader, and it will be understandable from the ensuing description that such zoom lens presents various effects.

In the present embodiment, particularly the first group is constituted by three lenses of lens shapes which will be described later, whereby the fluctuations of various aberrations such as spherical aberration, etc. during a magnification change are corrected well.

Accordingly, in any magnification change condition, a state in which the aberrations are corrected can always be maintained and therefore, a high optical performance can be provided.

That is, in the zoom lens of the present embodiment, the first group thereof is constituted by a negative first lens whose surface on the reducing side has a sharper curvature than the surface on the enlarging side, a positive second lens whose surface on the enlarging side has a sharper curvature than the surface on the reducing side, and a negative third lens having a predetermined surface shape.

The negative first lens, the positive second lens and the negative third lens are arranged in succession from the enlarging side, whereby the above-described effects are obtained.

In the description of the present embodiment, the "enlarging side" refers to that side on which the conjugate point farther than the principal point of the zoom lens exists when two conjugate points, i.e., the object point and the image point, are taken at any zoom position (projection magnification). The "reducing side" refers to the opposite side, namely, that side on which the conjugate point nearer than the principal point of the zoom lens exists. Also, in the foregoing description of the lens shape, the "sharp curvature" refers to the fact that irrespective of the positive or the negative of the refractive power, the absolute value of the refractive power is great or that surface having a curvature in which this absolute value is great.

In the present embodiment, to obtain a good optical performance over the full magnification change range in the range of photographing magnification of 50–33, the lenses in the second group 20 may preferably be constructed so as to satisfy the following conditions.

The second group 20 of the zoom lens of the present embodiment has a fourth lens portion IV of positive refractive power having a plurality of lenses, a positive fifth lens V, a negative sixth lens VI, a negative seventh lens VII having a sharper curvature on the reducing side than on the enlarging side, an eighth lens VIII whose both lens surfaces are convex, and a negative ninth lens IX having a sharper curvature on the enlarging side than on the reducing side, said fifth lens V and said sixth lens VI being independent of each other or cemented together, and the following conditions must be satisfied:

$$0.1 < f_1/f_3 < 1.8 \quad (1)$$

$$0.5 < f_a/F1 < 2.2 \quad (2)$$

$$0.1 < \Phi_{62}/\Phi_{72} < 2.3 \quad (3)$$

$$-5 < f_9/F2 < -1 \quad (4)$$

where F1 and F2 are the focal lengths of the first 10 and the second group 20, respectively, $f_i$ is the focal length of said ith lens, $f_a$ is the focal length of an air lens formed by the second II and the third lens III, and $\Phi_{62}$ and $\Phi_{72}$ are the refractive powers of the reducing side surfaces of the sixth VI and the seventh lens VII, respectively.

The technical meanings of the aforementioned conditional expressions (1)–(4) will now be described.

Conditional expression (1) is concerned with the ratio between the refractive powers of the negative first lens I and the negative third lens III in the first group 10, and is for correcting chiefly spherical aberration well while achieving compactness of the lens system. If the refractive power of the first lens I becomes too strong beyond the lower limit of this condition, correction of spherical aberration will become difficult, and if the refractive power of the third lens III becomes too strong beyond the upper limit of this condition, the spacing between the first and the second group will have to be increased to keep the spacing between the first and the second group at a predetermined amount. Consequently, the entire lens system will disadvantageously become bulky.

Conditional expression (2) is concerned with the refractive power of the air lens formed by the positive second lens II and the negative third lens III in the first group 10, and is for correcting the coma particularly in the long focal distance well. If the lower limit of this condition is exceeded, spherical aberration will be over-corrected, and if the upper limit of this condition is exceeded, introversive coma will greatly occur in the long focal distance and it will become difficult to correct it well.

Conditional expression (3) is concerned with the ratio between the refractive powers of the reducing side lens surfaces, respectively, of the sixth lens VI and the seventh lens VII in the second group 20, and is for reducing the astigmatic difference particularly in the long focal length. If the lower limit of this condition is exceeded, astigmatic difference will become great in the long focal length, and if the upper limit of this condition is exceeded, spherical aberration will disadvantageously tend to be over-corrected.

Conditional expression (4) is for keeping the refractive power of the ninth lens IX in the second group 20 appropriate, reducing astigmatic difference over the full magnification change range and further setting the optical arrangement of the second group 20 appropriately. If the upper limit of this condition is exceeded, the spacing between the object point and the second group 20 will become smaller on the reducing side, and this is not preferable in terms of mechanism.

In the present embodiment, for the purpose of aberration correction, the fourth lens portion IV is preferably constituted by two groups of three lenses, i.e., a cemented lens comprising a negative and a positive lens cemented together and a positive lens, as shown, or two independent positive lenses, or a cemented lens comprising a negative and a positive lens cemented together. Also, it is preferable that the first lens I, the second lens II and the seventh lens VII each be constituted by a meniscus-shaped lens having its convex surface facing the enlarging side and the ninth lens IX be constituted by a meniscus-shaped lens having its convex surface facing the reducing side, because the aberration fluctuation in a magnification change can be corrected well.

In the zoom lens of the present embodiment, as a matter of course, the object may be disposed on any of the enlarging side and the reducing side so that the zoom lens may be used as an enlarging system or a reducing system.

Numerical value examples of the present invention will be shown below in the form of tables. In each of the numerical value examples below, the enlarging side is the object side, Ri is the radius of curvature of the ith surface from the object side, Di is the thickness and air space of the ith lens from the object side, and Ni and $\nu_i$ are the refractive index and Abbe number, respectively, of the glass of the ith lens from the object side. $\beta$ is magnification, $\omega$ is a half angle of view, FNo is F-number, and f is the focal length of the entire system.

NUMERICAL VALUE EXAMPLE 1

| F = 20.320~30.536 | 2ω = 22.8°~22.8° | FNo = 2.1~3.2 | β = 50~33 |
|---|---|---|---|
| R1 = 54.288 | D1 = 1.500 | N1 = 1.83400 | ν1 = 37.2 |
| R2 = 17.468 | D2 = 4.770 | | |
| R3 = 20.742 | D3 = 2.212 | N2 = 1.84666 | ν2 = 23.9 |
| R4 = 45.455 | D4 = 1.072 | | |
| R5 = −138.775 | D5 = 2.300 | N3 = 1.77250 | ν3 = 49.6 |
| R6 = 74.049 | D6 = 18.598~2.715 | | |
| R7 = 392.213 | D7 = 1.500 | N4 = 1.84666 | ν4 = 23.9 |
| R8 = 41.627 | D8 = 2.809 | N5 = 1.77250 | ν5 = 49.6 |
| R9 = −61.018 | D9 = 0.378 | | |
| R10 = 33.924 | D10 = 2.076 | N6 = 1.83400 | ν6 = 37.2 |
| R11 = 81.323 | D11 = 0.200 | | |
| R12 = 16.030 | D12 = 5.920 | N7 = 1.80400 | ν7 = 46.6 |
| R13 = 88.193 | D13 = 1.723 | | |
| R14 = 448.730 | D14 = 1.400 | N8 = 1.84666 | ν8 = 23.9 |
| R15 = 15.006 | D15 = 2.785 | | |
| R16 = 24.956 | D16 = 1.400 | N9 = 1.75520 | ν9 = 27.5 |
| R17 = 12.276 | D17 = 2.920 | | |
| R18 = 19.344 | D18 = 4.545 | N10 = 1.80610 | ν10 = 40.9 |
| R19 = −36.730 | D19 = 0.660 | | |
| R20 = −18.714 | D20 = 2.000 | N11 = 1.62004 | ν11 = 36.3 |
| R21 = −32.553 | | | |

NUMERICAL VALUE EXAMPLE 2

| F = 20.320~30.536 | 2ω = 22.8°~22.8° | FNo = 2.1~3.2 | β = 50~33 |
|---|---|---|---|
| R1 = 42.243 | D1 = 1.500 | N1 = 1.69350 | ν1 = 53.2 |
| R2 = 15.697 | D2 = 5.118 | | |
| R3 = 17.879 | D3 = 2.251 | N2 = 1.69895 | ν2 = 30.1 |
| R4 = 33.970 | D4 = 1.353 | | |
| R5 = −108.969 | D5 = 2.300 | N3 = 1.62299 | ν3 = 58.2 |
| R6 = 57.546 | D6 = 18.641~2.758 | | |
| R7 = 330.200 | D7 = 1.500 | N4 = 1.84666 | ν4 = 23.9 |
| R8 = 40.666 | D8 = 2.794 | N5 = 1.77250 | ν5 = 49.6 |
| R9 = −59.947 | D9 = 0.366 | | |
| R10 = 34.395 | D10 = 2.071 | N6 = 1.83400 | ν6 = 37.2 |
| R11 = 79.699 | D11 = 0.200 | | |
| R12 = 15.959 | D12 = 5.777 | N7 = 1.80400 | ν7 = 46.6 |
| R13 = 81.623 | D13 = 1.734 | | |
| R14 = 320.194 | D14 = 1.400 | N8 = 1.84666 | ν8 = 23.9 |
| R15 = 15.011 | D15 = 2.271 | | |
| R16 = 22.816 | D16 = 1.400 | N9 = 1.75520 | ν9 = 27.5 |
| R17 = 12.512 | D17 = 3.584 | | |
| R18 = 21.008 | D18 = 3.665 | N10 = 1.80610 | ν10 = 40.9 |
| R19 = −41.448 | D19 = 0.752 | | |
| R20 = −18.387 | D20 = 2.000 | N11 = 1.62004 | ν11 = 36.3 |
| R21 = −27.652 | | | |

NUMERICAL VALUE EXAMPLE 3

| F = 20.320~30.536 | 2ω = 22.8°~22.8° | FNo = 2.1~3.2 | β = 50~33 |
|---|---|---|---|
| R1 = 40.651 | D1 = 1.500 | N1 = 1.77250 | ν1 = 49.6 |
| R2 = 16.057 | D2 = 4.862 | | |
| R3 = 18.370 | D3 = 2.147 | N2 = 1.75520 | ν2 = 27.5 |
| R4 = 32.299 | D4 = 1.424 | | |
| R5 = −105.480 | D5 = 2.300 | N3 = 1.67790 | ν3 = 55.3 |
| R6 = 82.414 | D6 = 18.528~2.645 | | |
| R7 = 298.418 | D7 = 1.500 | N4 = 1.75520 | ν4 = 27.5 |
| R8 = 45.133 | D8 = 2.873 | N5 = 1.67790 | ν5 = 55.3 |
| R9 = −47.348 | D9 = 0.368 | | |
| R10 = 30.481 | D10 = 2.133 | N6 = 1.74400 | ν6 = 44.7 |
| R11 = 73.788 | D11 = 0.200 | | |
| R12 = 14.313 | D12 = 5.444 | N7 = 1.71300 | ν7 = 53.8 |
| R13 = 70.262 | D13 = 1.774 | | |
| R14 = 341.054 | D14 = 1.400 | N8 = 1.80518 | ν8 = 25.4 |
| R15 = 13.841 | D15 = 1.412 | | |
| R16 = 24.283 | D16 = 1.400 | N9 = 1.75520 | ν9 = 27.5 |

-continued

| F = 20.320~30.536 | | FNo = 2.1~3.2 | |
|---|---|---|---|
| 2ω = 22.8°~22.8° | | β = 50~33 | |
| R17 = 12.100 | D17 = 3.603 | | |
| R18 = 20.800 | D18 = 5.666 | N10 = 1.80610 | ν10 = 40.9 |
| R19 = −31.543 | D19 = 0.635 | | |
| R20 = −18.071 | D20 = 2.000 | N11 = 1.62004 | ν11 = 36.3 |
| R21 = −31.909 | | | |

NUMERICAL VALUE EXAMPLE 4

| F = 20.320~30.536 | | FNo = 2.1~3.2 | |
|---|---|---|---|
| 2ω = 22.8°~22.8° | | β = 50~33 | |
| R1 = 53.144 | D1 = 1.500 | N1 = 1.83400 | ν1 = 37.2 |
| R2 = 17.580 | D2 = 4.861 | | |
| R3 = 20.895 | D3 = 2.165 | N2 = 1.84666 | ν2 = 23.9 |
| R4 = 46.475 | D4 = 1.126 | | |
| R5 = −114.970 | D5 = 2.300 | N3 = 1.77250 | ν3 = 49.6 |
| R6 = 77.571 | D6 = 19.474~3.592 | | |
| R7 = 417.998 | D7 = 1.500 | N4 = 1.84666 | ν4 = 23.9 |
| R8 = 37.700 | D8 = 2.894 | N5 = 1.77250 | ν5 = 49.6 |
| R9 = −65.139 | D9 = 0.525 | | |
| R10 = 34.108 | D10 = 2.128 | N6 = 1.83400 | ν6 = 37.2 |
| R11 = 80.389 | D11 = 0.200 | | |
| R12 = 16.021 | D12 = 5.408 | N7 = 1.80400 | ν7 = 46.6 |
| R13 = 91.610 | D13 = 1.701 | | |
| R14 = 227.605 | D14 = 1.400 | N8 = 1.84666 | ν8 = 23.9 |
| R15 = 19.064 | D15 = 2.687 | | |
| R16 = 26.175 | D16 = 1.400 | N9 = 1.75520 | ν9 = 27.5 |
| R17 = 11.092 | D17 = 3.554 | | |
| R18 = 19.235 | D18 = 3.013 | N10 = 1.80610 | ν10 = 40.9 |
| R19 = −56.231 | D19 = 0.879 | | |
| R20 = −17.885 | D20 = 2.000 | N11 = 1.62004 | ν11 = 36.3 |
| R21 = −27.619 | | | |

NUMERICAL VALUE EXAMPLE 5

| F = 20.320~30.536 | | FNo = 2.1~3.2 | |
|---|---|---|---|
| 2ω = 22.8°~22.8° | | β = 50~33 | |
| R1 = 53.712 | D1 = 1.500 | N1 = 1.83400 | ν1 = 37.2 |
| R2 = 17.985 | D2 = 4.548 | | |
| R3 = 21.167 | D3 = 2.160 | N2 = 1.84666 | ν2 = 23.9 |
| R4 = 48.131 | D4 = 1.118 | | |
| R5 = −92.443 | D5 = 2.300 | N3 = 1.77250 | ν3 = 49.6 |
| R6 = 84.489 | D6 = 18.505~2.623 | | |
| R7 = 319.117 | D7 = 1.500 | N4 = 1.84666 | ν4 = 23.9 |
| R8 = 40.681 | D8 = 2.747 | N5 = 1.77250 | ν5 = 49.6 |
| R9 = −65.765 | D9 = 0.336 | | |
| R10 = 33.373 | D10 = 2.076 | N6 = 1.83400 | ν6 = 37.2 |
| R11 = 83.418 | D11 = 0.200 | | |
| R12 = 15.490 | D12 = 6.269 | N7 = 1.80400 | ν7 = 46.6 |
| R13 = 81.853 | D13 = 1.949 | | |
| R14 = 3480.363 | D14 = 1.400 | N8 = 1.84666 | ν8 = 23.9 |
| R15 = 11.343 | D15 = 2.430 | | |
| R16 = 25.683 | D16 = 1.400 | N9 = 1.75520 | ν9 = 27.5 |
| R17 = 18.091 | D17 = 2.587 | | |
| R18 = 22.316 | D18 = 4.808 | N10 = 1.80610 | ν10 = 40.9 |
| R19 = −30.523 | D19 = 0.627 | | |
| R20 = −17.513 | D20 = 2.000 | N11 = 1.62004 | ν11 = 36.3 |
| R21 = −29.230 | | | |

NUMERICAL VALUE EXAMPLE 6

| F = 20.320~30.536 | | FNo = 2.1=3.2 | |
|---|---|---|---|
| 2ω = 22.8°~22.8° | | β = 50~33 | |
| R1 = 68.489 | D1 = 1.500 | N1 = 1.84666 | ν1 = 23.9 |
| R2 = 20.790 | D2 = 4.513 | | |
| R3 = 22.816 | D3 = 3.220 | N2 = 1.84666 | ν2 = 23.9 |
| R4 = 252.206 | D4 = 0.613 | | |
| R5 = −133.762 | D5 = 2.300 | N3 = 1.77250 | ν3 = 49.6 |

-continued

| F = 20.320~30.536 | | FNo = 2.1=3.2 | |
|---|---|---|---|
| 2ω = 22.8°~22.8° | | β = 50~33 | |
| R6 = 39.685 | D6 = 29.029~5.572 | | |
| R7 = 603.718 | D7 = 1.500 | N4 = 1.84666 | ν4 = 23.9 |
| R8 = 46.800 | D8 = 2.612 | N5 = 1.77250 | ν5 = 49.6 |
| R9 = −71.751 | D9 = 0.371 | | |
| R10 = 35.386 | D10 = 2.189 | N6 = 1.83400 | ν6 = 37.2 |
| R11 = 86.982 | D11 = 0.200 | | |
| R12 = 15.871 | D12 = 6.209 | N7 = 1.80400 | ν7 = 46.6 |
| R13 = 84.161 | D13 = 1.720 | | |
| R14 = 551.413 | D14 = 1.400 | N8 = 1.84666 | ν8 = 23.9 |
| R15 = 15.372 | D15 = 2.032 | | |
| R16 = 28.677 | D16 = 1.400 | N9 = 1.75520 | ν9 = 27.5 |
| R17 = 12.092 | D17 = 2.858 | | |
| R18 = 20.595 | D18 = 3.196 | N10 = 1.80610 | ν10 = 40.9 |
| R19 = −26.817 | D19 = 0.319 | | |
| R20 = −20.339 | D20 = 2.000 | N11 = 1.62004 | ν11 = 36.3 |
| R21 = −54.761 | | | |

NUMERICAL VALUE EXAMPLE 7

| F = 20.320~30.536 | | FNo = 2.1~3.2 | |
|---|---|---|---|
| 2ω = 22.8°~22.8° | | β = 50~33 | |
| R1 = 51.318 | D1 = 1.500 | N1 = 1.83481 | ν1 = 42.7 |
| R2 = 22.505 | D2 = 12.034 | | |
| R3 = 21.453 | D3 = 3.662 | N2 = 1.78472 | ν2 = 25.7 |
| R4 = 70.060 | D4 = 0.741 | | |
| R5 = −232.134 | D5 = 2.000 | N3 = 1.83400 | ν3 = 37.2 |
| R6 = 30.666 | D6 = 18.061~2.179 | | |
| R7 = 580.397 | D7 = 2.000 | N4 = 1.80610 | ν4 = 40.9 |
| R8 = −46.329 | D8 = 0.389 | | |
| R9 = 30.806 | D9 = 1.708 | N5 = 1.83400 | ν5 = 37.2 |
| R10 = 78.051 | D10 = 0.200 | | |
| R11 = 16.583 | D11 = 5.353 | N6 = 1.78590 | ν6 = 44.2 |
| R12 = −29.458 | D12 = 1.400 | N7 = 1.84666 | ν7 = 23.9 |
| R13 = 15.949 | D13 = 5.880 | | |
| R14 = 32.531 | D14 = 1.810 | N8 = 1.75520 | ν8 = 27.5 |
| R15 = 12.142 | D15 = 4.184 | | |
| R16 = 20.246 | D16 = 5.832 | N9 = 1.83400 | ν9 = 37.2 |
| R17 = −46.848 | D17 = 2.353 | | |
| R18 = −63.241 | D18 = 2.000 | N10 = 1.76182 | ν10 = 26.6 |
| R19 = 439.647 | | | |

NUMERICAL VALUE EXAMPLE 8

| F = 20.320~30.536 | | FNo = 2.1~3.2 | |
|---|---|---|---|
| 2ω = 22.8°~22.8° | | β = 50~33 | |
| R1 = 297.398 | D1 = 1.500 | N1 = 1.83481 | ν1 = 42.7 |
| R2 = 23.789 | D2 = 6.298 | | |
| R3 = 30.171 | D3 = 2.404 | N2 = 1.80518 | ν2 = 25.4 |
| R4 = 153.854 | D4 = 0.784 | | |
| R5 = −83.710 | D5 = 2.000 | N3 = 1.74400 | ν3 = 44.7 |
| R6 = 126.205 | D6 = 16.165~0.283 | | |
| R7 = 728.275 | D7 = 2.000 | N4 = 1.80610 | ν4 = 40.9 |
| R8 = −46.157 | D8 = 0.395 | | |
| R9 = 31.647 | D9 = 2.031 | N5 = 1.83400 | ν5 = 37.2 |
| R10 = 82.118 | D10 = 0.200 | | |
| R11 = 16.752 | D11 = 5.304 | N6 = 1.78590 | ν6 = 44.2 |
| R12 = −29.718 | D12 = 1.400 | N7 = 1.84666 | ν7 = 23.9 |
| R13 = 16.103 | D13 = 6.412 | | |
| R14 = 30.185 | D14 = 1.810 | N8 = 1.78472 | ν8 = 25.7 |
| R15 = 12.955 | D15 = 4.425 | | |
| R16 = 20.482 | D16 = 5.959 | N9 = 1.83400 | ν9 = 37.2 |
| R17 = −35.103 | D17 = 1.987 | | |
| R18 = −22.792 | D18 = 2.000 | N10 = 1.69895 | ν10 = 30.1 |
| R19 = −107.339 | | | |

NUMERICAL VALUE EXAMPLE 9

| F = 20.320~30.536 | 2ω = 22.8°~22.8° | FNo = 2.4~3.6 | β = 50~33 |
|---|---|---|---|
| R1 = 49.814 | D1 = 1.500 | N1 = 1.83400 | ν1 = 37.2 |
| R2 = 15.881 | D2 = 3.612 | | |
| R3 = 18.711 | D3 = 1.213 | N2 = 1.84666 | ν2 = 23.9 |
| R4 = 39.822 | D4 = 1.213 | | |
| R5 = −107.639 | D5 = 2.300 | N3 = 1.77250 | ν3 = 49.6 |
| R6 = 101.426 | D6 = 18.463~2.581 | | |
| R7 = 249.987 | D7 = 1.500 | N4 = 1.84666 | ν4 = 23.9 |
| R8 = 20.636 | D8 = 3.851 | N5 = 1.80610 | ν5 = 40.9 |
| R9 = −41.264 | D9 = 0.338 | | |
| R10 = 15.593 | D10 = 7.349 | N6 = 1.83400 | ν6 = 37.2 |
| R11 = 69.652 | D11 = 2.246 | | |
| R12 = −113.842 | D12 = 1.400 | N7 = 1.84666 | ν7 = 23.9 |
| R13 = 16.278 | D13 = 2.359 | | |
| R14 = 21.453 | D14 = 1.400 | N8 = 1.72825 | ν8 = 28.5 |
| R15 = 12.988 | D15 = 2.450 | | |
| R16 = 20.527 | D16 = 5.693 | N9 = 1.83481 | ν9 = 42.7 |
| R17 = −29.954 | D17 = 0.579 | | |
| R18 = −18.014 | D18 = 2.000 | N10 = 1.62004 | ν10 = 36.3 |
| R19 = −33.237 | | | |

The various aberrations in the lens systems shown in Numerical Value Examples 1-9 above are shown in FIGS. 4 to 12.

The aberration graphs of FIGS. 4A to 12B represent spherical aberration, curvature of field and distortion, and are concerned with a case where F-number FNo has been varied to FNo=2.1→3.2 by a magnification change, and A of each of these figures shows the aberrations when FNo=2.1, and B of each of these figures shows the aberrations when FNo=3.2.

The symbol M in the aberration graphs indicates the aberration curve on the meridional plane, and the symbol S in the aberration graphs indicates the aberration curve on the sagittal plane.

For information, the relations between the aforementioned conditional expressions (1)-(4) and Numerical Value Examples 1-9 are shown in Table 1 below.

TABLE 1

| Numerical Value Examples | Conditional Expressions (1) $f_1/f_3$ | (2) $f_a/F1$ | (3) $\Phi_{62}/\Phi_{72}$ | (4) $f_9/F2$ |
|---|---|---|---|---|
| 1 | 0.51 | 1.00 | 0.92 | −3.19 |
| 2 | 0.61 | 0.92 | 0.93 | −4.10 |
| 3 | 0.52 | 0.81 | 0.93 | −3.02 |
| 4 | 0.54 | 0.97 | 0.65 | −3.78 |
| 5 | 0.58 | 0.93 | 1.79 | −3.20 |
| 6 | 0.91 | 1.92 | 0.88 | −2.15 |
| 7 | 1.52 | 1.65 | 0.85 | −3.08 |
| 8 | 0.46 | 1.72 | 0.87 | −1.78 |
| 9 | 0.42 | 0.85 | 0.93 | −2.84 |

According to the present embodiment, of the two lens groups 10 and 20 in the embodiment, the lens construction of the forward group 10 is set under various conditions as previously described, whereby a zoom lens of good optical performance suitable for use in a microfilm reader, a printer or the like can be achieved.

Further, the lens construction of the second group 20 and the refractive power arrangement of the entire lens system are set as previously described and the aforementioned conditions are satisfied, whereby there can be achieved a zoom lens of high resolving power having a bright F-number in which the projection magnification has been continuously varied with the distance between the object and the image being maintained at a predetermined finite distance.

Specifically, in the present invention, the construction of the negative first group is set by a refractive power arrangement of a negative first lens, a positive second lens and a negative third lens in succession from the enlarging side, thereby accomplishing the compactness of the optical system and the ease of correction of aberrations. Thereby, the provision of a bright zoom lens in which aberration fluctuations are small even if projection magnification is continuously changed is made possible.

Further, the refracting surface of the above-described negative first lens is provided by the reducing side surface having a sharper curvature than the enlarging side surface and the refracting surface of the positive second lens is provided by the enlarging side surface having a sharper curvature than the reducing side surface, whereby better aberration correction is made possible.

Also, as described above in the embodiments, the values of $f_1/f_3$ and $f_a/F1$ are set within particular ranges, whereby correction of spherical aberration and coma can be accomplished well, thus contributing to the above-mentioned compactness.

Consequently, by designing the construction of the negative first group under certain conditions as mentioned above and suitably designing the positive second group, there can be provided a zoom lens endowed with a desired optical performance.

Further, by designing the lens construction of the positive second group on the basis of the various conditions as mentioned in the above-described embodiment, for example, conditional expressions (3) and (4), there can be provided various forms of zoom lens endowed with a high optical performance.

Such zoom lens provides especially a zoom lens suitable for use in a microfilm reader which is used at an enlarged magnification.

I claim:

1. A zoom lens including:

a negative first group disposed on an enlarging side, said first group consisting of, in succession from the enlarging side, a negative first lens whose reducing side surface has a sharper curvature than the enlarging side surface thereof, a positive second lens whose enlarging side surface has a sharper curvature than the reducing side surface thereof, and a negative third lens; and a positive second group disposed on the reducing side;

the spacing between said first group and said second group being variable to accomplish a magnification change.

2. A zoom lens according to claim 1, wherein the following condition is satisfied:

$$0.1 < f_1/f_3 < 1.8,$$

where $f_1$ is the focal length of said first lens, and $f_3$ is the focal length of said third lens.

3. A zoom lens according to claim 1, wherein the following condition is satisfied:

$$0.5 < f_a/F1 < 2.2,$$

where $f_a$ is the focal length of an air lens formed by said first and third lenses, and F1 is the focal length of said first group.

4. A zoom lens according to claim 1, wherein said second group comprises, in succession from the enlarging side, a positive fourth lens having a plurality of lens elements, a positive fifth lens, a negative sixth lens, a negative seventh lens whose reducing side surface has a sharper curvature than the enlarging side surface, an eighth lens whose both lens surfaces are convex, and a negative ninth lens whose enlarging side surface has a sharper curvature than the reducing side surface.

5. A zoom lens according to claim 4, wherein the following conditions are satisfied:

$$0.1<\Phi_{62}/\Phi_{72}<2.3$$

$$-5<f_9/F2<-1$$

where $\Phi_{62}$ and $\Phi_{72}$ are the refractive powers of the reducing side surfaces of said sixth lens and said seventh lens, respectively, $f_9$ is the focal length of said ninth lens, and F2 is the focal length of said second group.

6. A zoom lens for effecting a magnification change while maintaining the distance between an object and the image thereof constant, said zoom lens including in succession from an enlarging side:

a negative first group consisting of a first lens of negative refractive power, a second lens of positive refractive power whose enlarging side surface has a sharper curvature than the reducing side surface thereof, and a third lens of negative refractive power; and a positive second group, the spacing between said second group and said first group being variable to accomplish a magnification change.

7. A zoom lens according to claim 6, wherein the following condition is satisfied:

$$0.1<f_1/f_3<1.8,$$

where $f_1$ and $f_3$ are the focal lengths of said first lens and said third lens, respectively.

8. A zoom lens according to claim 6, wherein the following condition is satisfied:

$$0.5<f_a/F1<2.2,$$

where $f_a$ is the focal length of an air lens formed by said second and third lenses, and F1 is the focal length of said first group.

9. An optical system of variable projection magnification for reading a microfilm, including:

a first group of negative refractive power positioned on an enlarging side, said first group consisting of in succession from the enlarging side a negative first lens, a positive second lens and a negative third lens; and a second group of positive refractive power positioned on a reducing side, the spacing between said second group and said first group being variable to change the projection magnification;

said optical system satisfying the following conditions:

$$0.1<f_1/f_3<1.8 \text{ and } 0.5<f_a/F1<2.2,$$

where $f_i$ (i=1, 2, 3) is the focal length of the ith lens in said first group, $f_a$ is the focal length of an air lens formed by said second and third lenses, and F1 is the focal length of said first group.

10. Finite distance zoom lens approximately having a photographing magnification in a range of 50–30 consisting of:

a negative first group disposed on an enlarging side, said first group comprising, in succession from the enlarging side, a negative first lens whose reducing side surface has a sharper curvature than the enlarging side surface thereof, a positive second lens whose enlarging side surface has a sharper curvature than the reducing side surface thereof, and a negative third lens; and a positive second group disposed on the reducing side;

the spacing between said first group and said second group being variable to accomplish a magnification change.

11. A zoom lens for effecting a magnification change while maintaining the distance between an object and the image thereof constant, said zoom lens including in succession from an enlarging side:

a negative first group consisting of a first lens of negative refractive power, a second lens of positive refractive power and a third lens of negative refractive power; and a positive second group, the spacing between said second group and said first group being variable to accomplish a magnification change, wherein said lens satisfies the following condition:

$$0.1<f_1/f_3<1.8,$$

where $f_1$ and $f_3$ are the focal lengths of said first lens and said third lens, respectively.

12. A zoom lens for effecting a magnification change while maintaining the distance between an object and the image thereof constant, said zoom lens including in succession from an enlarging side:

a negative first group consisting of a first lens of negative refractive power, a second lens of positive refractive power and a third lens of negative refractive power; and a positive second group, the spacing between said second group and said first group being variable to accomplish a magnification change, wherein said lens satisfies the following condition:

$$0.5<f_a/F_1<2.2,$$

where $f_a$ is the focal length of an air lens formed by said second and third lenses, and $F_1$ is the focal length of said first group.

* * * * *

UNITED STATES PATENT AND TRADEMARK OFFICE
CERTIFICATE OF CORRECTION

PATENT NO. : 4,889,416

DATED : December 26, 1989

INVENTOR(S) : Yamada

It is certified that error appears in the above-identified patent and that said Letters Patent is hereby corrected as shown below:

On the title page:

[56] References Cited:

FOREIGN PATENT DOCUMENTS

"59306 1/1986 Japan" should read
--59306 3/1986 Japan--.

Signed and Sealed this

Fourth Day of June, 1991

*Attest:*

HARRY F. MANBECK, JR.

*Attesting Officer*

*Commissioner of Patents and Trademarks*